United States Patent [19]

Gossedge et al.

[11] Patent Number: 4,961,513
[45] Date of Patent: Oct. 9, 1990

[54] CONTAINER WITH PEELABLE SEAL, AND METHOD FOR MAKING THE SAME

[75] Inventors: Graham M. Gossedge, Didcot; Alan J. Maskell, Harwell; John Moore, Melton Mowbray, all of England

[73] Assignee: MB Group plc Engineering Company, Reading, England

[21] Appl. No.: 285,549

[22] Filed: Dec. 16, 1988

[30] Foreign Application Priority Data

Dec. 21, 1987 [GB] United Kingdom ............... 8729725

[51] Int. Cl.$^5$ ............................................. B65D 17/40
[52] U.S. Cl. ................................... 220/276; 220/266; 220/270; 220/359; 156/69; 53/373; 53/478
[58] Field of Search ................. 206/633; 220/265, 266, 220/270, 276, 359; 53/373, 478; 156/69

[56] References Cited

U.S. PATENT DOCUMENTS

| | | | |
|---|---|---|---|
| 4,332,332 | 6/1982 | Ingeman | 220/266 |
| 4,379,008 | 4/1983 | Gross et al. | 156/69 |
| 4,434,907 | 3/1984 | Ingeman | 220/276 |
| 4,529,100 | 7/1985 | Ingeman | 220/359 |
| 4,659,405 | 4/1987 | Walter | 156/69 |
| 4,865,217 | 9/1989 | Yoshimoto | 220/359 |

*Primary Examiner*—David T. Fidei
*Attorney, Agent, or Firm*—St. Onge Steward Johnston & Reens

[57] ABSTRACT

A container comprising a body with a rim (6) of which at least the upper surface is of a first plastics material, and a flexible closure (8) of which at least the under surface is of a second plastics material different from the first, the body and closure being attached together by a heat seal formed between the said surfaces thereof, wherein the heat seal includes radially inner and radially outer ears (18,16) formed during the heat sealing operation by heat and pressure, each ear having a core (22,20) which is formed of the first plastics material and is joined integrally to the rim by a thin root (34,32), and an envelope (26,28) which is formed of the second plastics material integrally with the closure and which envelops the core and tapers in beneath the core to a position adjacent to the thin root of the core, both ears lying on the top of the rim around at least a substantial part of the container periphery, the closure having a free portion (10) located outside the heat seal for grasping by the user, and the closure and both ears being manually peelable together away from the rim by use of the free portion.

29 Claims, 4 Drawing Sheets

CONTAINER WITH PEELABLE SEAL, AND METHOD FOR MAKING THE SAME

BACKGROUND OF THE INVENTION

This invention relates to heat-sealing flexible closures onto containers which have rims or flanges around their mouths.

It has been known to heat-seal a flexible closure onto the rim of a plastics container containing, for example, a food product, one such process being described and claimed in Applicants' UK Patent No. 2067157. In commercial exploitation of the invention of Patent No. 2067157 Applicants have made the container of polypropylene with an intermediate barrier layer for oxygen resistance, and for the closure material have proposed a laminated material of aluminium foil laminated to a layer of HDPE (high density polyethylene) for sealability. In use, the closure is heat sealed onto the container rim with the HDPE side of the closure material in contact with the polypropylene upper surface of the container rim. However, the seal achieved has not been manually peelable, that is to say, it has been necessary for the consumer to cut the closure material inside the rim in order to open the sealed container.

SUMMARY OF THE INVENTION

The invention arms to provide a type of heat seal which is peelable, and also a method of, and apparatus for, forming such a peelable heat seal.

From one aspect, the invention provides a container comprising a body with a rim of which at least the upper surface is of a first plastics material, and a flexible closure of which at least the under surface is of a second plastics material different from the first, the body and closure being attached together by a heat seal formed between the said surfaces thereof, wherein the heat seal includes radially inner and radially outer ears formed during the heat sealing operation by heat and pressure, each ear having a core which is formed of the first plastics material and is joined integrally to the rim by a thin root, and an envelope which is formed of the second plastics material integrally with the closure and which envelops the core and tapers in beneath the core to a position adjacent to the thin root of the core, both ears lying on the top of the rim around at least a substantial part of the container periphery, the closure having a free portion located outside the heat seal for grasping by the user, and the closure and both ears being manually peelable together away from the rim by use of the free portion.

From another aspect, the invention provides a method of forming a peelable seal between a first plastics material of the upper surface of a container rim and a second and different plastics material of the under surface of a flexible closure the method comprising superimposing the closure on the container with the said surfaces in contact, and applying heat and pressure to the closure by means of a heat sealing head which is shaped and dimensioned to depress the closure into the container rim, the temperature and dimensions of the heat sealing head and the duration and pressure of its application to the closure being such that the seal has radially spaced inner and outer ears each having a core which is formed of the first plastics material and is joined integrally to the rim by a thin root, and an envelope which is formed of the second plastics material integrally with the closure and which envelops the core and tapers in beneath the core to a position adjacent to the thin root of the core, both ears lying on the top of the rim around at least a substantial part of the container periphery, and the closure and both ears being manually peelable together away from the rim starting from the outer edge of the closure.

From yet a third aspect of the invention provides an apparatus for forming a peelable seal between a first plastics material of a flexible closure and a second and different plastics material of a rim of a container, the apparatus comprising a heat sealing head having an annular protrusion dimensioned for cooperation with the container rim, heating means for heating the protrusion, and drive means for urging the head and container together with the closure therebetween and with the first and second plastics materials in contact, the protrusion being dimensioned so as over at least a first part of the periphery of the sealing head to then indent the container rim intermediate, but spaced from, the inner and outer boundaries of the latter, the heating and drive means being adapted to cause the heat sealing head to create a manually peelable seal between the closure and container rim by fusion and mechanical interengagement of the first and second plastics materials thereof.

In order that the invention may be more clearly understood, some embodiments thereof will now be described, by way of example, with reference to the accompanying drawings, in which:

DESCRIPTION OF THE PREFERRED EMBODIMENTS

Figure 1:
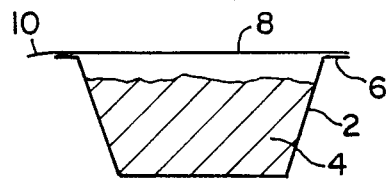
FIG. 1 shows a type of sealed and product filled packaging container to which the invention may be applied.

FIG. 1 shows a cross-section through a round polypropylene pot 2 which has been filled with a product 4, such as a foodstuff, the pot having a downwardly and inwardly tapering side wall 36 closed by a base (not shown) and an integral radially extending rim 6 carried by the side wall and onto which a flexible closure 8 provided with a tear tab 10 has been heat sealed. The material of the closure 8 is an aluminium foil onto the underside of which is laminated an HDPE layer.

Figure 2:
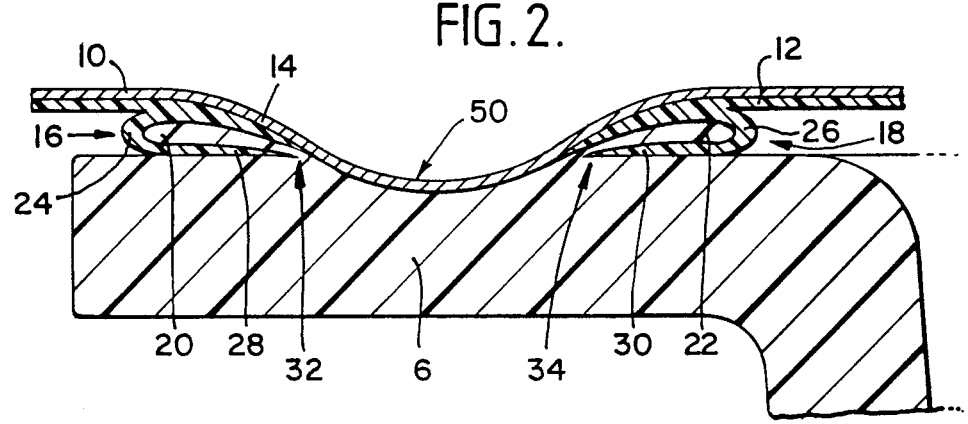
FIG. 2 is an enlarged view of a radial cross-section through a part of the heat-seal of a container in accordance with the invention.

In accordance with an aspect of the invention, the seal between the closure 8 and the rim 6 is produced so as around most of the periphery of the container to have the form shown in enlarged cross-section in FIG. 2. In order to form a seal having this structure, the closure material 8 is placed with its HDPE layer 12 towards the rim and with its foil 14 uppermost. A heated sealing head having a generally circular (or other annular shape if the pot is not round) protrusion on its underside is then brought into contact with the upper foil side of the closure at an approximately central position across the width of the rim, and the heat of the sealing head softens the layer 12 and also the upper part of the rim 6 so that pressure applied to the sealing head can depress the foil into the rim as shown in FIG. 2.

This produces a seal which has two radially spaced and generally concentric, continuous ears, namely an outer ear indicated generally (in FIG. 2) at 16 and an inner ear indicated generally at 18. The ears 16 and 18 both lie generally on top of the rim 6; they have respective cores 20 and 22 which are formed of the polypropylene rim material and are integrally attached to the rim at thin and rupturable roots 32 and 34, and envelopes 24 and 26 which are formed of the HDPE closure material. It can be seen from FIG. 2 that the envelopes 24 and 26 envelop the respective cores, and where indicated at 28 and 30 taper in beneath them to terminate adjacent to the thin roots 32 and 34. Above the ears the HDPE polymer of the envelopes 24, 26 is integral with that of the layer 12 so that, with the possible exception later to be described, the ears and the closure are unitary. However, because of the substantial chemical compatibility of the polypropylene and HDPE polymers and the manner in which the ears are formed, any bonding which occurs between each ear 16, 18 and the underlying surface of the rim 6 is weak and can be disregarded for the purposes of the following description.

It is found that the heat seal formed in this way has a substantial inherent resistance to bursting when the container is subjected to impact loads or other rough handling, and it is believed that this inherent robustness is largely derived from the physical interengagement of the envelopes 24 and 26 around the cores 20 and 22, which they embrace somewhat in the manner of claws. It is found, furthermore, that the disposition of both ears on top of the container rim is necessary if this inherent robustness is to be fully realised despite food or other contamination of the rim on the closure material which may be present when the heat seal is made.

Figure 3:
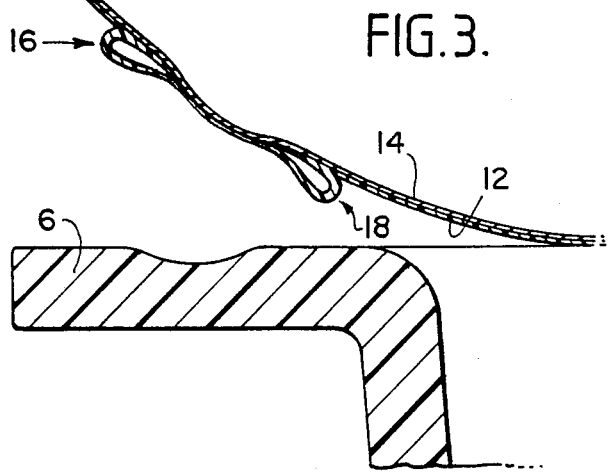
FIG. 3 illustrates how the seal as shown in FIG. 2 is broken when the closure is peeled by hand away from the container rim.

However, by manually applying upward tension to the closure material by means of the tear tab 10, the user can readily lift the ear 16 in the vicinity of the tear tab away from the underlying rim. Continued upward force exerted by the tear tab thereafter tears through the thin root 32 of core 20 and peels the closure away by delaminating the relatively weak bond which is made with the underlying polypropylene of the container rim in the central annular region 50 of the seal lying between the ears 16, 18. (The closure material of the region 50 has a thin remnant layer of HDPE on the underside of the metal foil 14, but for clarity this remnant layer is omitted from FIG. 2). When the peeling of the closure reaches the core root 34 in ear 18, the root 34 is torn through and the entire ear 18 likewise comes away from the polypropylene rim 6 with the closure material, thus forming a clean separation of the closure from the rim as shown in FIG. 3. The closure can therefore be peeled completely away from the container, with progressive tearing of the roots 32, 34 in each direction (around the container periphery) away from the tear tab as removal proceeds.

Figure 5:
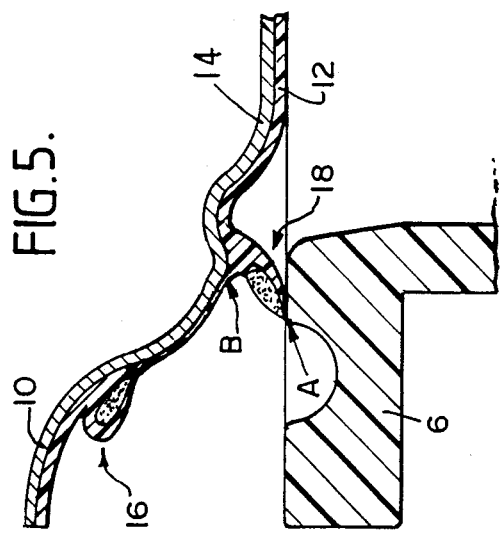
FIG. 5 shows in radial cross-section a type of failure which may occasionally occur when opening a seal in accordance with FIG. 2.

It has been found that when peeling a seal which is wholly of the type shown in FIG. 2, that is to say, with the ear 18 disposed entirely on top of the container rim, it occasionally occurs that, instead of the inner ear 18 breaking away cleanly from the rim 6 at the point A shown in FIG. 5 as has just been described above, the root 34 of the core of ear 18 fails to tear and instead the upper part of the envelope 26 parts from the upper side of the core 30 as is illustrated in FIG. 5. If this happens, it is still possible that further tension will cause the ear 18 to tear away at point A and leave a clean rim as desired, but it is also possible that the HDPE layer 12 will tear and thereafter delaminate from the foil 14 starting at the point B, in which case satisfactory peeling of the closure away from the rim will not have been achieved. Occasionally a container having a peelable heat seal entirely as is depicted in FIG. 2 is found in practice not to be reliably peelable.

Figure 6:
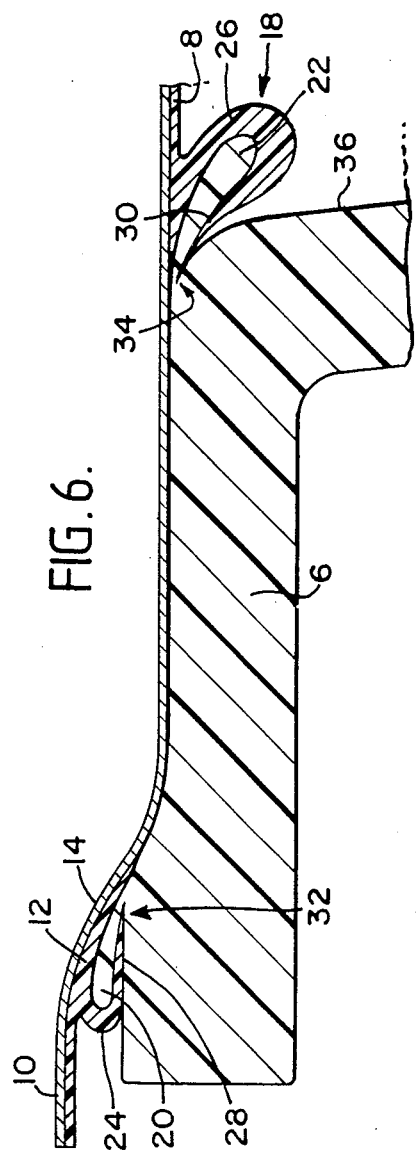
FIG. 6 shows a modified form of the seal in FIG. 2, which normally will avoid the type of failure illustrated in FIG. 5.

It has been found that unreliable peeling of this kind can be substantially reduced or eliminated by modifying the form of the seal in the locality of the tear tab in the manner shown in FIG. 6; the seal around the remainder of the periphery is left as is shown in FIG. 2 to give the sealed package a high level of resistance to bursting in transit and storage. In FIG. 6, instead of the radially inner ear 18 being formed on the top of the rim 6, over a short peripheral length of the container centred on the tear tab 10, it is displaced radially inwardly so that its root 34 is located on the elbow formed between the rim 6 and the side wall 36 of the container, the inner ear itself therefore being located within the container interior in this locality.

From a comparison of FIG. 6 with FIG. 2 it will be understood that over the length of the modified seal (FIG. 6) the closure makes close (and peelably bonded) contact with the whole of the container rim surface inside the outer ear 16, whereas where the seal is unmodified (FIG. 2) the inner ear is generally interposed between the closure and the container rim so holds the closure material in a slightly uplifted position where it is spaced from the container rim, or at least, if touching, is not bonded to it. Additionally from a comparison of FIGS. 2 and 6 it will be understood that at each of the two intersections or cross-overs between the unmodified seal and the modified seal, the inner ear crosses between higher and lower levels and between radially outer and inner positions.

During removal of the closure initial peeling occurs over the modified seal (FIG. 6), the tear tab 10 being positioned to localise the applied forces to that locality.

Separation of the closure from the container therefore occurs over a broad and increasingly wide front up to the inner edge of the container rim, where the inner ear is first torn from the container. Further peeling then propagates the tearing of the inner ear until the tear reaches the two cross-overs by which time the tearing forces on the ears, in particular the inner ear, are directed largely tangentially of the container. Tear propagation from the modified seal to the unmodified seal is therefore successfully made, with little or no danger of possibly harmful delamination of the kind shown in FIG. 5.

Thus peeling for closure removal is reliably initiated using the peel mode shown in FIG. 6, but over the greater part of the container it is achieved using the peel mode of FIG. 2. The sealed package therefore shows a combination of mechanical robustness with ease and reliability of opening.

Figure 4:
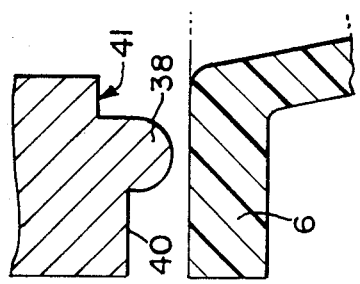
FIG. 4 shows in cross-section the shape of a sealing head which may be used to form a seal in accordance with FIG. 2.
Figure 7:
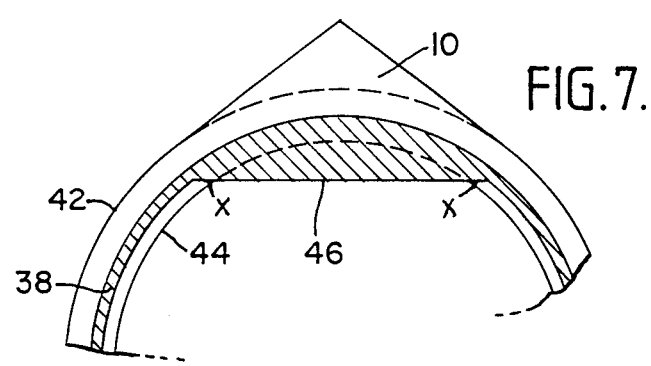
FIG. 7 illustrates how the heat-seal around the rim of the round pot may, for the major part of the periphery of the pot, be formed as shown in FIG. 2, but for the remaining minor part of the periphery, may be formed as shown in FIG. 6 so as to help initiate the peeling of the seal without failure of the type shown in FIG. 5 occurring.
Figure 8:
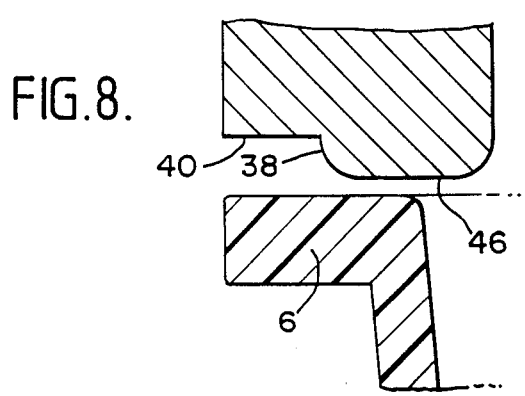
FIG. 8 shows how the cross-section of the sealing head may be modified to produce the seal formation of FIG. 6.

Turning now to the sealing head which is used to form the seal as shown in FIGS. 2 and 6, reference is made to FIGS. 4, 7 and 8. In its overall cross-sectional shape the sealing head generally corresponds to the container rim; it has a downwardly extending, rounded annular protrusion 38 as shown in FIG. 4, which depresses the closure material into the rim as already described. However, extending radially outwardly from the protrusion 38 is a land or shoulder 40; by limiting possible upward movement of the closure above the outer ear 16, this land acts to constrict and elongate the outer ear as it is being extruded during the sealing operation. The outer ear is therefore formed with the desired thin root 32, thereby facilitating peel initiation.

The land 40 stands proud of, i.e. is located below, the surface 41 of the sealing head which lies inside the protrusion 38. The surface 41 is relieved from engagement by the closure during heat sealing, the thickness of the root 34 being thereby made somewhat greater than that of the root 32 so as to be capable of withstanding bursting forces without tearing.

In a possible modification of the heat sealing head, the land 40 is omitted so that no engagement of the head with the closure occurs outside the protrusion 38 during heat sealing. The land 40 may be replaced by a relieved surface on the same level as the relieved surface 41.

FIG. 7 diagrammatically illustrates the geometry of the sealing head in relation to the rim and closure. The rim 6 extends between its outer and inner boundaries 42 and 44, and the narrow shaded area indicates the extent of the protrusion 38 on the sealing head as seen in plan view in relation to the rim. Around the major part of the periphery of rim 6 the protrusion 38 is circular and narrow relative to the rim as illustrated in FIG. 4, lying between the land 40 on its outside and the relieved surface 41 on its inside. However, between points X and X (FIG. 7) corresponding in angular extend to the tear tab 10, the protrusion is extended radially inwardly as a sector-shaped land or shoulder 46. During the sealing process this land 46 extends the depression of the rim under heat and pressure inwardly as far as the inner edge of the rim, and thus forces the inner ear 18 inwardly over the inner edge of the rim, as has been described above in relation to FIG. 6. It will therefore be understood that the points, X,X, correspond approximately to the cross-overs mentioned above for the inner ear 18.

Figure 9:
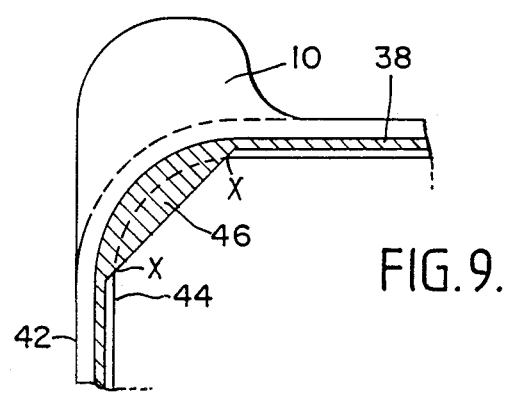
FIG. 9 is similar to FIG. 7 but illustrates the formation of a seal initiation region at the corner of a packaging container in the form of a rectangular tray.

FIG. 9 is similar to FIG. 7 but shows the tear tab and modified form of seal applied at the corner of a rectangular container. Reference numerals the same as those in FIG. 7 are used and it is not believed that FIG. 9 requires further description.

It has been mentioned above that it is known to form non-peelable seals between container rims and closures made of the materials specifically referred to above. This has been done using a sealing head heated to a temperature of about 275° C. For the purposes of the present invention, however, the temperature of the head and the period of time for which it is applied to the closure are made insufficient to form a non-peelable seal, this being achieved by reducing the head temperature to between 210° and 250° C. (preferably about 230° C.) and applying the head to the closure for only such time as is necessary to ensure that some melting of the polypropylene of the container rim occurs. In this respect it is to be noted that the melting point of the polypropylene is about 175° C. whereas that of the HDPE is about 130° C. Considerable melting of the HDPE material therefore occurs, a substantial part of it being prior to any melting of the polypropylene and forming beads of molten HDPE into which the molten polypropylene can be extruded by the pressure applied to the sealing head. With a typical thickness of the container rim this heat sealing to form a peelable seal results in depression of the top of the rim of less than 25%, and preferably between 12 and 15%, of the rim thickness. For the same container the formation of a non-peelable seal would have reduced the rim thickness by typically 25% to 30% of its original value.

Figure 10:
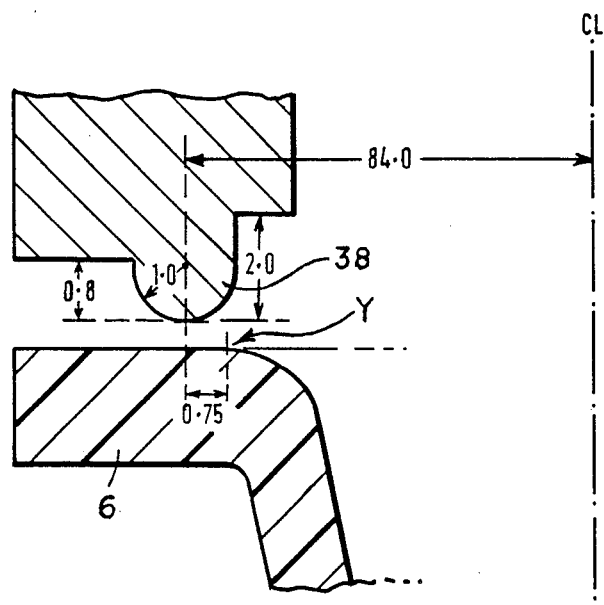
FIG. 10 shows (not to scale) the head of FIG. 4 enlarged and with preferred dimensions in millimeters indicated.

One particular example of the invention, which has given especially good results, will be described with reference to FIG. 10. Dimensions of the sealing head are shown in millimeters, and it is to be noted that the radius of the surface of protrusion 38 was 1.0 mm, the protrusion 38 and the container were both circular about the central axis CL, the centre of the protrusion 38 was at a radius of 84 mm from axis CL and was 0.75 mm outside the point Y at which the top of the rim curves downwards from its flat portion and towards the inner wall of the container. The thickness of the rim was 1±0.15 mm, the upper layer of the rim (which was of multilayer construction) was of polypropylene, and the closure material was a foil having a lower layer of HDPE 50 microns thick and an upper layer of aluminium 50 microns thick.

The head was applied at an estimated pressure of 80 p.s.i. to the foil (pressure being, it is found, the least critical operating variable) at temperatures from 200° C. to 250° C. for a period of one second. The seals formed were peelable, in the desirable manner indicated in FIG. 3 (or, at worst as shown in FIG. 5 but with the ear 18 breaking away at A to leave a clean rim) over the temperature range from 200° C. to 235° C.

However, the burst strength was a little inadequate (greater than 12 p.s.i. being desirable) at 200° C. and unreliable peeling was possible at 240° C. The optimum combination of burst strength, sufficiently easy peelability, and peelability of the desired kind, was achieved from about 220° C. to 235° C.

In general, the production of acceptable seals seems to be quite temperature sensitive, and the relatively wide temperature window available using the operating conditions and materials just described renders that particular set of parameters attractive, since the need for very precise temperature control is avoided.

An approximate indicator of the likelihood of acceptable peelable seals with adequate strength being produced is the percentage compression of the rim, the optimum in the above example being between 12% and 15%. An alternative indicator is the depth of the depression formed in the upper surface of the foil. When this was measured by subtracting the total foil plus rim thickness after sealing, from the total foil plus rim thickness before sealing, the best seals had a depression depth of 0.17–0.22 mm and they were largely acceptable over a range from 0.1 to 0.3 mm.

Other containers have also been prepared under the same conditions as the example just described, but using a different closure material. The heat sealing polymer of the closure material was different from the polyethylene of the closure material used as described above, but again had a substantially lower melting point than the polypropylene forming the heat sealing surface of the container. The results were similar except for a greater tendency for the inner ear 18 to be left on the container rim when sealing temperatures above 220° C. were employed; that is to say, a reduced window of sealing temperatures was available for achieving the most desired type of peeling.

The modified form of heat seal (e.g. as shown in FIG. 6) is believed to have a lower bursting strength than the unmodified form (e.g. FIG. 2), and to be more adversely affected by contamination of the container rim. Therefore, for applications of the invention in which burst strength and other mechanical properties are particularly important and/or in which contamination is likely to be particularly severe or aggressive, only one peel initiation site is preferred and the modified form of heat seal is made to occupy as small as possible a percentage of the container periphery, consistent with ease and reliability of peeling; for such an application it is preferred that the modified heat seal should occupy at most 10% of the container periphery; for the largest sizes of container a maximum of 5% or less may be possible. Furthermore, whilst some increase in maloperation described above with reference to FIG. 5 can be expected, for maximum resistance to bursting it is possible to employ exclusively a heat-sealing process such as is illustrated in FIG. 2, that is to say, with the inner ear located wholly on top of the container rim; for that purpose the heat sealing head described above with reference to the drawings may be modified by omission of the land 46.

For applications in which relatively light demands are made on the heat seal, it may be possible to provide two or more tear initiation sites each having an associated length of modified seal and a pair of inner ear cross-overs. The modified form of seal may then, in total, occupy a substantial proportion of the container periphery, although it is preferred that the major part of the seal should be unmodified.

With such an arrangement two or more peel initiation sites may be provided, suitably located around the container periphery and having associated tear tabs or free margins of the closure for grasping by the user. In one possible embodiment of the invention the protrusion of the heat sealing head has, for forming the inner ear, a series of associated lands (corresponding to the land 46), which are disposed in regular succession around its periphery. Each land is arcuate, e.g. part-circular, and concave towards the interior of the sealing head. Together the lands therefore form a series of inwardly directed cusps which are dimensioned for their flanks to form the cross-over pairs for a like number of peel initiation sites produced by the lands. For initiating peeling at an of these sites the closure may be provided with an annular margin capable of being grasped by the user; the margin may be scalloped or have scallop edges, the scallops being disposed in angular correspondence with the cusps.

The invention is not limited in application to the particular materials described for the embodiments shown. For example, the container may be of other than polypropylene, and/or the closure may have a plastics material other than HDPE for heat-sealing. In order to avoid the need to perform the heat-sealing operation within close limits of time and temperature it is preferred that the plastics materials used for the heat-seal surfaces of the closure and the container should be relatively incompatible, that is to say they should not readily form an adhesive bond between them. Amongst the plastics material combinations which are possible are the following, the closure material being given first in each case:

LDPE (low density polyethylene)/HDPE (high density polyethylene); modified polypropylene/polypropylene; polypropylene/PET (polyethylene terephthalate); nylon/PET.

For proper formation of the inner and outer ears, that is to say, with cores formed of the container rim material and with the envelopes formed of the closure material, the cores being integrally joined to the container rim by thin and rupturable roots, the plastics material of the closure should have a substantially lower melting point than that of the container rim. Applicants believe that a difference in the melting points of at least 10° C. is essential for a viable heat sealing process. In some circumstances, particularly where the plastics materials have widely different melt viscosities, the difference in the melting points may need to be considerably greater than 10° C.

The container and closure may each be of multilayer structure, and may include a metal layer or be wholly of thermoplastics material.

The closure material may have a high degree of flexibility or it may be what is often referred to as "semi-rigid".

We claim:

1. A container comprising a body with a rim of which at least the upper surface is of a first plastics material, and a flexible closure of which at least the under surface is of a second plastics material different from the first, the body and closure being attached together by a heat seal formed between the said surfaces thereof, wherein the heat seal includes radially inner and radially outer ears formed during the heat sealing operation by heat and pressure applied by a heat sealing head, each ear having a core which is formed of the first plastics material and is joined integrally to the rim by a thin root, and an envelope which is formed of the second plastics material integrally with the closure and which envelops the core and tapers in beneath the core to a position adjacent to the thin root of the core, both ears lying on the top of the rim around at least a substantial part of the container periphery, the closure having a free portion located outside the heat seal for grasping by the user, and the closure and both ears being manually peelable together away from the rim by use of the free portion.

2. A container as claimed in claim 1, wherein adjacent the free portion of the closure the inner ear is located in the internal corner of the container formed between the radially inner edge of the rim and the closure.

3. A container as claimed in claim 2, wherein over a plurality of first portions of the seal both ears lie on the top of the rim and over a plurality of second portions of the seal alternate with the first portions thereof the inner ear is disposed in the said internal corner of the container, the closure having at least one said free portion adjacent the second portions of the seal.

4. A container as claimed in claim 3, wherein the closure has a continuous peripheral free margin to form a said free portion for the second portion of the seal.

5. A container as claimed in claim 2, 3, or 4, wherein the inner ear lies on top of the container rim over at least half of the container periphery.

6. A container as claimed in claim 2, which has one free portion of closure and an adjacent single continuous part of the container periphery at which the inner ear is located in the internal corner of the container, the said single continuous part occupying at most 10% of the container periphery.

7. A container as claimed in claim 1 wherein the first plastics material is polypropylene.

8. A container as claimed in claim 7 wherein the second plastics material is HDPE.

9. A container as claimed in claim 8 wherein the flexible closure is a foil comprising an upper layer of aluminium and a lower layer of HDPE laminated together.

10. A container as claimed in claim 9 wherein the aluminium and HDPE layers are each approximately 50 microns thick.

11. A container as claimed in claim 7 wherein the flexible closure is a foil comprising an upper layer of aluminium and a lower layer of plastics material having a substantially lower melting point than polypropylene, the layers being laminated together.

12. A container as claimed in claim 1 wherein the container rim is approximately 1 mm thick where it is not compressed.

13. A container as claimed in claim 1 wherein the upper surface of the closure is depressed by between 0.10 and 0.30 mm at the middle of the seal.

14. A container as claimed in claim 1 wherein the rim of the container in the region between the two ears has been reduced in thickness by the heat sealing operation by less than 25%.

15. A container as claimed in claim 14 wherein the reduction in thickness is between 12% and 15%.

16. A container comprising a body with a rim of which at least the upper surface is of a first plastics material, and a flexible closure of which at least the under surface is of a second plastics material different from the first, the body and closure being attached together by a heat seal formed between the said surfaces thereof, wherein the heat seal includes radially inner and radially outer ears formed during the heat sealing operation by heat and pressure applied by a heat sealing band, each ear having a core which is formed of the first plastics material and is joined integrally to the rim by a thin root, and an envelope which is formed of the second plastics material integrally with the closure and which envelops the core and tapers in beneath the core to a position adjacent to the thin root of the core, the outer ear lying on the top of the rim, and the inner ear being located in the internal corner of the container formed between the radially inner edge of the rim and the closure, the closure having a free portion located outside the heat seal for grasping by the user, and the closure and both ears being manually peelable together away from the rim by use of the free portion.

17. A method of forming a peelable seal between a first plastics material of the upper surface of a container rim and a second and different plastics material of the under surface of a flexible closure the method comprising superimposing the closure on the container with the said surfaces in contact, and applying heat and pressure to the closure by means of a heat sealing head which is shaped and dimensioned to depress the closure into the container rim, the temperature and dimensions of the heat sealing head and the duration and pressure of its application to the closure being such that the seal has radially spaced inner and outer ears each having a core which is formed of the first plastics material and is joined integrally to the rim by a thin root, and an envelope which is formed of the second plastics material integrally with the closure and which envelops the core and tapers in beneath the core to a position adjacent to the thin root of the core, both ears lying on the top of the rim around at least a substantial part of the container periphery, and the closure and both ears being manually peelable together away from the rim starting from the outer edge of the closure.

18. A method as claimed in claim 17, wherein the first plastics material is polypropylene.

19. A method as claimed in claim 18 wherein the second plastics material is high density polyethylene (HDPE).

20. A method as claimed in claim 19 wherein the flexible closure is a foil comprising an upper layer of aluminium and a lower layer of HDPE laminated together.

21. A method as claimed in claim 20 wherein the aluminium and HDPE layers are each approximately 50 microns thick.

22. A method as claimed in claim 18 wherein the flexible closure is a foil comprising an upper layer of aluminium and a lower layer of plastics material having a substantially lower melting point than polypropylene, the layers being laminated together.

23. A method as claimed in claims 17, 18, 19, 20, 21, or 22 wherein the container rim is approximately 1 mm thick where it is not compressed.

24. A method as claimed in claim 17 wherein the upper surface of the closure is depressed by between 0.10 and 0.30 mm at the middle of the seal.

25. A method as claimed in claim 18 wherein the temperature of the heat sealing head is within the range of 210° C. to 250° C.

26. A method as claimed in claim 25 wherein the temperature range is 220° C. to 235° C.

27. A method as claimed in claim 26 wherein the temperature of the heat sealing head is about 230° C.

28. A method as claimed in claim 17 comprising causing the heat sealing head to reduce the thickness of the rim of the container in the region between the two ears by less than 25%.

29. A method as claimed in claim 28 wherein the reduction in thickness is between 12% and 15%.

* * * * *

UNITED STATES PATENT AND TRADEMARK OFFICE
CERTIFICATE OF CORRECTION

PATENT NO. : 4,961,513

DATED : October 9, 1990

INVENTOR(S) : Graham M. Gossedge et al

It is certified that error appears in the above-identified patent and that said Letters Patent is hereby corrected as shown below:

Title Page:

Item [73] Assignee: should read --CMB FOODCAN PLC--.

Signed and Sealed this

Seventh Day of January, 1992

Attest:

HARRY F. MANBECK, JR.

*Attesting Officer*     *Commissioner of Patents and Trademarks*